United States Patent

Ben-Levy et al.

[11] Patent Number: 5,867,604
[45] Date of Patent: Feb. 2, 1999

[54] IMAGING MEASUREMENT SYSTEM

[76] Inventors: Meir Ben-Levy, 1 Kadish Luz, Haifa 32159; Eyal Peleg, 155 Hadarim, Zoran 42823, both of Israel

[21] Appl. No.: 583,350

[22] Filed: Jan. 5, 1996

Related U.S. Application Data

[63] Continuation-in-part of Ser. No. 510,632, Aug. 3, 1995, abandoned.

[51] Int. Cl.⁶ .................................................. G06T 5/00
[52] U.S. Cl. ........................... 382/254; 382/276; 382/154; 356/376
[58] Field of Search ................................. 382/154, 254, 382/299, 276; 356/376, 387, 395

[56] References Cited

U.S. PATENT DOCUMENTS

| | | | |
|---|---|---|---|
| 3,822,098 | 7/1974 | Rudder et al. | 356/320 |
| 4,212,073 | 7/1980 | Balasubramanian | 356/376 |
| 4,629,324 | 12/1986 | Stern | 356/376 |
| 4,818,110 | 4/1989 | Davidson | 356/359 |
| 4,929,951 | 5/1990 | Small | 342/179 |
| 5,146,293 | 9/1992 | Mercer et al. | 356/376 |
| 5,381,236 | 1/1995 | Morgan | 356/376 |
| 5,471,307 | 11/1995 | Koliopoulos et al. | 356/376 |
| 5,509,090 | 4/1996 | Maruyama et al. | 382/276 |
| 5,555,090 | 9/1996 | Schmutz | 356/381 |

*Primary Examiner*—Jon Chang
*Attorney, Agent, or Firm*—Mark M. Friedman

[57] ABSTRACT

An apparatus for, and method of, improving the resolution of a conventional imaging system by effectively increasing the bandwidth of an imaging system's transfer function. An object is first illuminated with periodic illumination. The phase of the periodic illumination is varied while the periodic illumination is used to scan the object. A plurality of images are received by an imaging system whereby the images received correspond to variations in the phase of the periodic illumination. These images are subsequently processed to extract information in phase with the periodic illumination and information 90 degrees out of phase with the periodic illumination. In an optical microscope system, the periodic illumination also provides automatic focusing and three-dimensional imaging capabilities.

41 Claims, 3 Drawing Sheets

IMAGING MEASUREMENT SYSTEM

This application is a Continuation-in-Part of U.S. patent application Ser. No. 08/510,632, filed 3 Aug. 1995 now abandoned.

FIELD AND BACKGROUND OF THE INVENTION

The present invention relates to a system for enhancing the resolution of imaging systems by using a periodic pattern illumination.

Conventional imaging systems today, are characterized by a finite and limited optical system bandwidth. This limitation manifests itself in an optical system's optical transfer function (OTF). The transfer function of most imaging systems, including optical and electronic microscopes, characterizes a system by relating the spatial frequencies of an observed object or target, to those frequencies contained in a formed image. Many times, however, the resolution of such conventional imaging systems is not sufficient. In order to improve the resolution of an imaging system, it is necessary to extend the bandwidth of its transfer function. Increasing the bandwidth of the transfer function allows higher frequencies to be transmitted to the image. Several optical scanning systems have already been developed for just this purpose, such as the Confocal Microscope and the Near Field Microscope.

A transform space scanning imaging apparatus and method are disclosed in U.S. Pat. No. 4,929,951. The invention utilizes a different technique of generating a synthetic image from that of the present invention. The invention disclosed by the '951 patent utilizes a non-imaging receiver rather than a basic conventional imaging system. In addition, the invention fails to synthesize the transfer function of the object.

SUMMARY OF THE INVENTION

The present invention overcomes the limitations of the prior art by providing an imaging system that illuminates an object with periodic illumination whose phase characteristics are varied in a uniform and consistent manner. The scattered illumination is received by an imaging device and processed to create a synthetic image. The processed synthetic image has a new transfer function that has an enhanced high frequency response.

The present invention discloses an imaging system which transforms information from an object plane to a synthetic image plane with an improved transfer function. The information at the object plane is considered to be a multiplication of the illumination function with the target (i.e. object) function, which may be transmission, reflection or any other physical function which defines the interaction of the target with the illumination. Thus, the information at the object plane is actually created by the mixing of the illumination and the target information. Therefore, certain spatial frequencies observed at the image plane, may represent different frequencies of the observed target. Considering this interaction of illumination and target, the object of the present invention is to provide an apparatus for and method of improving the transmission of certain bands of frequencies of the target through an imaging system by choosing a suitable illumination function and suitable image processing.

The simplest case is to use a sine function as the illumination function. The mixing of the target with this illumination is a simple shift of the target frequencies by the illumination frequency. It is also possible that a periodic pattern consisting of several harmonics added together be used. The information carried by each harmonic can be readily identified. In the case of optical imaging, the periodic pattern may be created by imaging an optical grating and projecting the image upon the target.

In addition, phase information can be extracted. Typically, the phase of a real function may be determined by adding an imaginary part using the Hilbert transform. In the case of harmonic or periodic illumination, the phase of an image relative to the phase of the illumination can be measured. The information which is in phase with the illumination yields the real part of the image and the information which is 90 degrees out of phase will yield the imaginary part.

Hence, there is provided according to the teachings of the present invention, a method of improving the resolution of imaging systems, for imaging an object, comprising the steps of illuminating the object with a periodic pattern, scanning the object with the periodic pattern whereby the phase of the periodic pattern is varied, receiving a plurality of images, representing the periodic pattern scattered off the object, the images corresponding to variations in the phase of the periodic pattern, producing synthetic images by processing the plurality of images to extract information in phase with the periodic pattern and information 90 degrees out of phase with the periodic pattern.

There is also provided, according to the teachings of the present invention, an apparatus for enhancing the resolution of an imaging system, for imaging an object, comprising an energy source, periodic means for producing an illuminating periodic pattern in one dimension from the energy, the periodic means movable in one dimension whereby the phase of the periodic pattern may be varied in one dimension, first imaging means for passing the periodic pattern from the periodic means through to the object whereby the object scatters the periodic pattern, second imaging means coupled to the first imaging means, the second imaging means for converting the scattered energy into an electrical signal, the electrical signal representing images of the scattered energy, processing means coupled to the periodic means and the imaging means, the processing means for controlling the periodic means in one dimension, the processing means for extracting information in phase with the periodic pattern and information 90 degrees out of phase with the periodic pattern.

BRIEF DESCRIPTION OF THE DRAWINGS

The invention is herein described, by way of example only, with reference to the accompanying drawings, wherein.

DESCRIPTION OF THE PREFERRED EMBODIMENT

The present invention discloses an apparatus for and method of extending the bandwidth of a conventional imaging system by illuminating an object with periodic illumination, varying the phase of the illumination and processing the received scattered images to extract amplitude and phase data.

The principles and operation of the present invention may be better understood with reference to the drawings and the accompanying description.

The present invention describes a system 10 of enhancing the measuring capability of imaging systems. The basic concept behind the present invention, as described above, is to scan an object with periodic illumination, vary the phase of the periodic illumination and capture the scattered image. The received data is processed to produce synthetic images. Amplitude and phase information is then extracted about the object.

Figure 1:
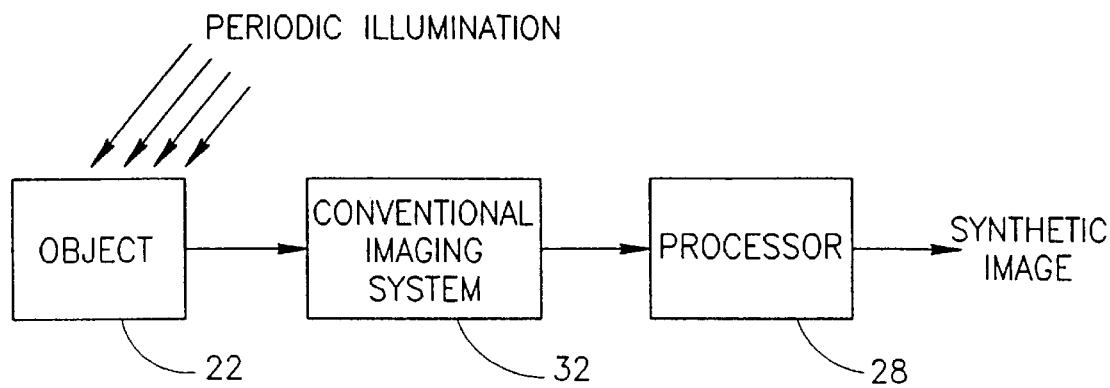
FIG. 1 is a high level block diagram of a preferred embodiment of the present invention.

As shown in FIG. 1, an object 22 is first scanned with periodic illumination. Object 22 scatters the illumination falling on it. Imaging means including a conventional imaging system 32 receives the scattered light image and converts it into electrical signals. A processor 28 performs image processing functions on the received data and forms a complex synthetic image whereby the amplitude and phase information about can be determined. This data is then processed further depending on the particular application and/or displayed on a screen. The functions (i.e. control, image processing, etc.) that processor 28 performs may be realized by more than one actual processor. Many processors many be utilized to better distribute the tasks system 10 must perform. Similarly, imaging system 32 may include one or more subimaging systems whereby each subimaging system contributes to a portion of imaging system 32.

There exist alternative ways to scan an object by periodic illumination. If coherent light is used to illuminate the object, it is possible to create an illumination pattern using the interference of two or more coherent light beams. The scanning affect is achieved by shifting the phase of the beams. If incoherent light is used to illuminate the object, it is possible to create an illumination pattern using a moving grating, whose image is projected onto the object or target. The grating is movable in one or more dimensions. It also possible to illuminate the object with partially coherent light. Partially coherent light is neither purely coherent or purely incoherent but somewhere in between. Scanning of the object may be performed in one or more dimensions.

The mathematical procedures and processes involved in generating synthetic images are presented below. First, the case involving one dimension is described followed by the case involving two dimensions.

The object is illuminated with energy, amplitude or any other physical quality that is significant to the measurement, having a space distribution $L(t,x)$, which is a good approximation at the range of interest:

$$L(t,x) = A_0 + A_1 \cos(2\pi x/\delta + \omega t + \psi_1) + A_2 \cos(4\pi x/\delta + 2\omega t + \psi_2) + \quad (1)$$

$L(t,x)$ is a periodic function in x, with period equal to $\delta$. The function in Eq. (1) is written as a series of harmonics having spatial frequencies $0, 1/\delta, 2/\delta, 3/\delta$.... A scanning process is carried out by either sequentially or continuously by varying the phase $\omega t$ of the illumination. The constant phase $\psi_1, \psi_2 \ldots$ is the phase of the illumination at $t=0$ and $x=0$. In the following description, $\psi_1, \psi_2 \ldots$ are ignored without any loss of generality, in order to shorten otherwise very long equations. $A_0, A_1, \ldots$, are constants in time and in the x-axis. In the general case, they may vary in the y-axis. In this case, L, the illumination distribution in equation (1) will also be a function of y, the second spatial axis, so that $L=L(x,y,t)$. A special case in which L is also periodic in the y-axis will be discussed in a later section.

An alternative to continuous scanning is scanning using sequences of energy illumination whereby the phase changes in uniform discrete steps from one sequence to another. The illumination function, $L_n(x)$, in this case is given by:

$$L_n(x) = A_0 + A_1 \cos(2\pi x/\delta + 2n\pi/N) + A_2 \cos(4\pi x/\delta + 4n\pi/N) + \quad (2)$$

Where $n=1, 2, 3 \ldots$ and N is an integer.

The result of illuminating the object with a periodic pattern, as described by $L(t,x)$ in Eq. (1), is an image which is continuously changing with time.

The image will have the form of $I(t,x,y)$ given by:

$$I(t,x,y) = B_0(x,y) + B_1(x,y)\cos(\omega t + \phi_1) + B_2(x,y)\cos(2\omega t + \phi_2) + \quad (3)$$

If the object is illuminated with sequential energy illumination scanning $L_n(x)$, as described in Eq. (2), conventional imaging system 32 will produce a sequence of images having the form of $I_n(x,y)$ given by:

$$I_n(x,y) = B_0(x,y) + B_1(x,y)\cos(2n\pi/N + \phi_1) + B_2(x,y)\cos(4n\pi/N + \phi_2) + (4)$$

At this point, a pair of synthetic images, $S_1(x,y)$ and $S_2(x,y)$, are defined for each harmonic $\omega, 2\omega, \ldots, k\omega$. The definition for the k'th harmonic is as given by:

$$B_k(x,y)\cos(k\omega t + \phi_k) = S_1(x,y)\cos(2k\pi x/\delta + k\omega t) + S_2(x,y)\sin(2k\pi x/\delta + k\omega t) \quad (5)$$

Since $\cos(2k\pi x/\delta + k\omega t)$ and $\sin(2k\pi x/\delta + k\omega t)$ are orthogonal functions, $S_1$ and $S_2$ are unique and well defined for any desired harmonic, k, as described in Eq. 5). In the case of sequential illumination of the object, the definition of $S_1(x,y)$ and $S_2(x,y)$ is given by the following equation:

$$B_k(x,y)\cos(2kn\pi/N + \phi_k) = S_1(x,y)\cos(2k\pi x/\delta + 2n\pi/N) + S_2(x,y)\sin(2k\pi x/\delta + 2n\pi/N) \quad (6)$$

It is important that N be large enough to avoid aliasing. The complex synthetic image S is defined by the following:

$$S(x,y) = S_1(x,y) + iS_2(x,y) \quad (7)$$

Where $i^2 = -1$.

Imaging system 10 processes and analyzes $S_1$ and $S_2$ (i.e. the complex synthetic image S) for a chosen k. This analysis is equivalent to finding the amplitude and phase of the Fourier transform of the received image, or equivalent to finding the sine and cosine transformations of $I(t,x,y)$ at the single frequency $k\omega$.

$S_1$ is produced by extracting the information in phase with the illuminating pattern, while $S_2$ is produced by extracting the information 90 degrees out of phase with the illuminating pattern.

The synthetic image, S, in (7), is "built up" from the linear combination of $S_1$ and $S_2$. For the purpose of understanding the previous equations, S may be considered to be a vector in the complex plane, and $S_1$ and $S_2$ may be considered to be the complex components of S. Thus, $S_1$ and $S_2$ may be thought of, respectively, as the projections of S on the real and imaginary axes of a complex plane.

Going back to (1), the object is illuminated by $L(t,x)$, which is a periodic function, represented as a cosine series. Illumination of the image results in an "output" represented by the cosine series given in (3) for $I(t,x,y)$. This is a function of time at angular frequency, $\omega$, where constant angular frequency represents a constant scanning rate. In (3), angular frequency, ω, is the same for each harmonic frequency (inverse time) component of the series representation of I(t,x,y), while phase, φ, is different for each harmonic frequency component. Each harmonic component is represented by a pair of amplitude, $B_n$, and phase, $\omega_n$, values. Thus, (3) is a polar representation of I(t,x,y). In (5), the cosine series representation of I(t,x,y) is equivalently rewritten as the sum of a cosine and a sine series with constant phase. In (5), I(t,x,y) is represented in rectangular form, since cosine and sine are orthogonal functions, at an angle of 90-degrees. Thus the coefficients of the cosine and the sine harmonic series are orthogonal components of I(t,x,y). Equation (5) gives the definition of the $S_1(x,y)$ and $S_2(x,y)$ as the coefficients of the cosine and sine components, respectively, of the $B_n$ of (3). Thus, $S_1$ is the real part, and $S_2$ is the imaginary part of synthetic image S(x,y) defined in (7). The two components $S_1$ and $S_2$ are obtained by mathematically analyzing an "optical image" to obtain its in-phase and 90-degrees out-of-phase components, respectively, as will be discussed further later. Various synthetic images may be produced mathematical processing which may include one or more components obtained from the optical image.

For scanning in both the x and y axis, the definition is similar to the one axis case. For two axis, the illumination function is given by the approximation:

$$L_{mn}(x, y) = A_0 + A_1\cos(2\pi x/\delta_x + 2\pi m/M)\cos(2\pi y/\delta_y + 2\pi n/N) + \quad (8)$$
$$A_2\cos(4\pi x/\delta_x + 4\pi m/M)\cos(2\pi y/\delta_y + 2\pi n/N) +$$
$$A_3\cos(2\pi x/\delta_x + 2\pi m/M)\cos(4\pi y/\delta_y + 4\pi n/N) +$$
$$A_4\cos(4\pi x/\delta_x + 4\pi m/M)\cos(4\pi y/\delta_y + 4\pi n/N) + \ldots$$

Where n, m=1, 2, . . . .
A set of illuminations $L_{mn}(x,y)$, m=1 . . . M and n=1 . . . N, will result in a set of images $I_{mn}(x,y)$. Synthetic images $S_1$, $S_2$, $S_3$ and $S_4$ are defined, which best fit $I_{mn}(x,y)$, in the following equation:

$$I_{mn}(x, y) = S_1(x, y)\cos(2\pi x/\delta_x + 2\pi m/M)\cos(2\pi y/\delta_y + 2\pi n/N) + \quad (9)$$
$$S_2(x, y)\sin(2\pi x/\delta_x + 2\pi m/M)\cos(2\pi y/\delta_y + 2\pi n/N) +$$
$$S_3(x, y)\cos(2\pi x/\delta_x + 2\pi m/M)\sin(2\pi y/\delta_y + 2\pi n/N) +$$
$$S_4(x, y)\sin(2\pi x/\delta_x + 2\pi m/M)\cos(2\pi y/\delta_y + 2\pi n/N) +$$
$$\text{Constant} + \text{Residue}$$

Where m=1 . . . M, n=1 . . . N, Constant is a constant and Residue is orthogonal residue of other harmonics of $1/\delta_x$ or $1/\delta_y$, and 1/M or 1/N.

Figure 2:
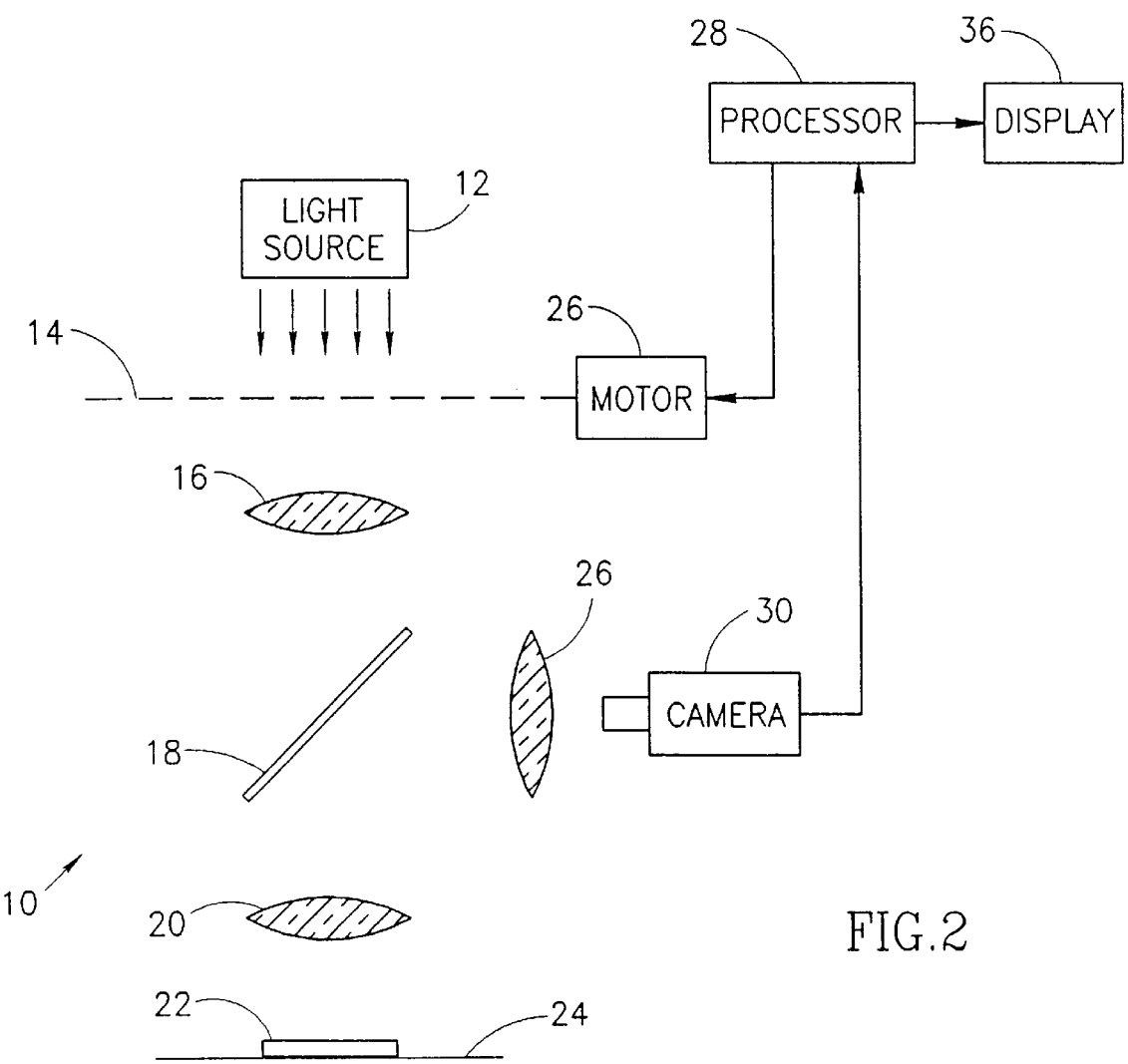
FIG. 2 is a detailed block diagram of a preferred embodiment of the present invention.

An example of a system that embodies the mathematical procedures and processing to extend the bandwidth of a conventional imaging system is illustrated in FIG. 2. Shown in FIG. 2 is a detailed block diagram of system 10. An energy source or light source 12 provides any type of electromagnetic radiation or energy such as coherent, incoherent or partially coherent light, microwave, infrared, ultraviolet, x-ray, radio, ultrasonic, etc. Energy from light source 12 passes through periodic means 14, which may be one grating for scanning in one dimension or two gratings for scanning in two dimensions, which is attached to motor 26. Motor 26 can move grating 14 either in discrete steps or continuously and in one or more dimensions. Energy then passes through grating 14 through grating lens 16. Following grating lens 16, the energy passes through beam splitter 18. The energy then passes through object lens 20. The energy then illuminates object 22 and is scattered by it.

During the process of scattering of the illuminating energy by object 22, the energy, in reality, is actually heterodyned with the object. The scattered energy is reflected 90 degrees by beam splitter 18 so as to pass through camera lens 26 and into camera 30. Camera 30 receives the image of the illumination scattered by object 22. Camera 30 converts the optical information received into electrical information suitable for processing by electronic processing means 28. One of the possible outputs from processor 28 is a display 36 showing a synthetic image of object 22.

In the example, energy (i.e. incoherent light) is used to illuminate object 22, however, coherent or partially coherent light could also be used with similar results. The example also involves scanning only in one dimension to simplify the mathematics. However, the example could easily be extended to two dimensions using the same line of analysis.

Object 22 is illuminated with intensity distribution L(t,x) as deemed by Eq. (1). It is assumed that the scattering of light from the object is linear with the intensity of the illumination. The intensity of light scattered by the object is $I_1(t,x)$ which is given by:

$$I_1(t,x) = Cr(x) \cos(-2\pi x/\delta + \omega t) + Res. \quad (10)$$

Where:
r(x)=object scattering function
Res.=higher harmonics of ω and direct current (DC)
C=constant In Eq. (10), r(x) is the scattering, reflection, transmission or any other physical function which defines the interactions of object 22 with the illuminating light. If conventional imaging system 32, in FIG. 1, is incoherent, having a transfer function $T_0(f_x)$ where $f_x$ is the spatial frequency in the x-axis. The following theorems (a) and (b) will be shown to be true:
(a) The synthetic image $S_1$, processed by system 10, as defined by Eq. (5), is a linear transformation of r(x) having a transfer function $T_1(f_x)$, as given by:

$$T_1(f_x) = C\{T_0(f_x - 1/\delta) + T_0(f_x + 1/\delta)\} \quad (11)$$

Where C is a constant. $S_1$ represents image information in phase with the illumination.
(b) The synthetic image $S_2$, processed by system 10, as defined by Eq. (5) is a linear transformation of $r_2(x)$ having a transfer function $T_2(f_x)$, as given by:

$$T_2(f_x) = C\{T_0(f_x - 1/\delta) - T_0(f_x + 1/\delta)\} \quad (12)$$

Where $r_2(x)$ is the Hilbert transform of r(x). $S_2$ represents information 90 degrees out of phase with the illumination.

Figure 3A:
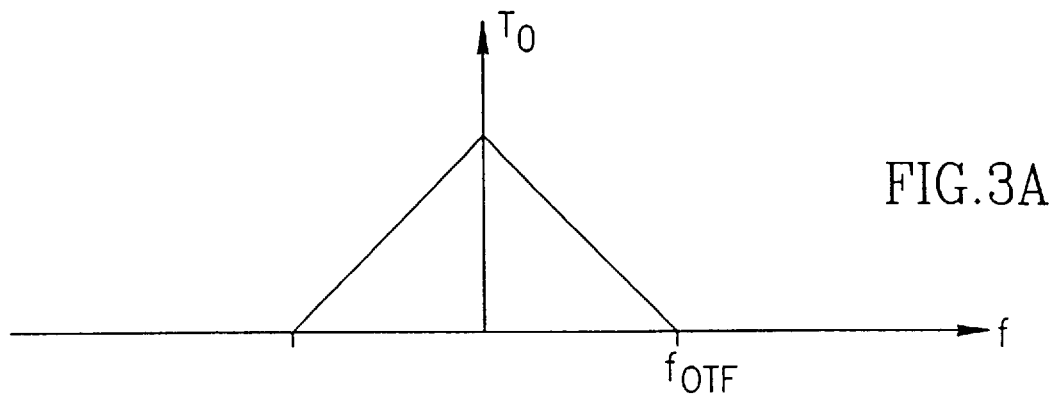
FIG. 3A is a diagram of the optical transfer function of the basic imaging system.
Figure 3B:
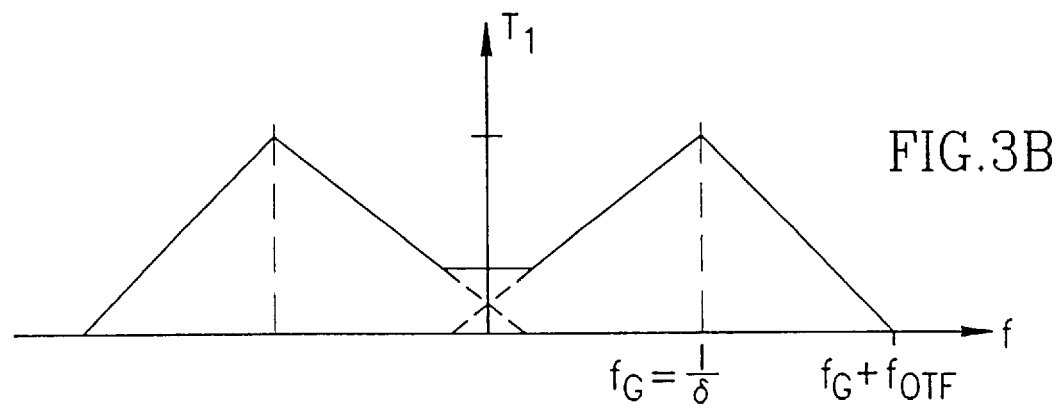
FIG. 3B is a diagram of the transfer function of the synthetic image, $S_1$.
Figure 3C:
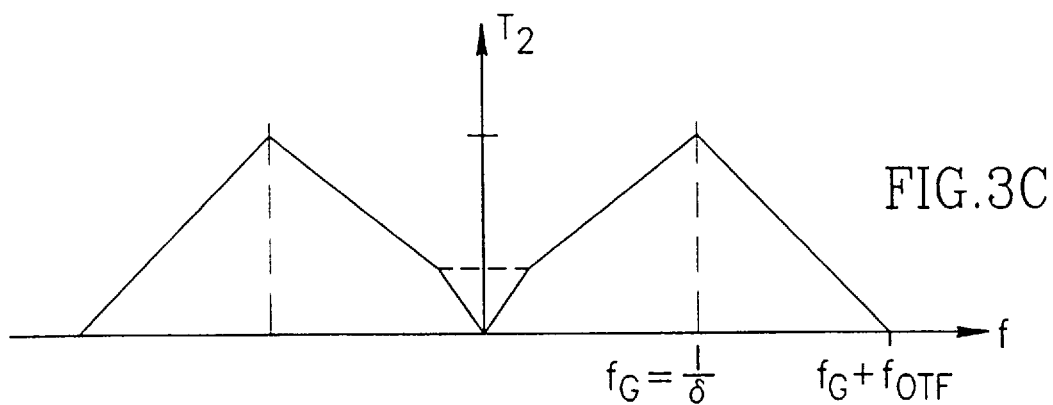
FIG. 3C is a diagram of the transfer function of the synthetic image, $S_2$; and, FIG. 4 illustrates an optical imaging measurement system.

The transfer functions $T_1$ and $T_2$ are shown in FIGS. 3B and 3C for the classical incoherent diffraction limited optical transfer function $T_0$ shown in FIG. 3A. The cutoff frequency of transfer functions $T_1$ and $T_2$ is $f_G + f_{OTF}$. As is apparent from FIGS. 3A to 3C, the bandwidth of the synthetic images has been extended by $f_G$ or 1/δ. It is important to note that while conventional imaging system 32 acts as a low pass filter at zero frequency, system 10 acts as a bandpass filter at the frequency of grating 14, $f_G$. To better understand this phenomenon, assume information about object 22 exists at a certain frequency $f_0$ and that $f_0 > f_{OTF}$. When object 22 is heterodyned or mixed with the periodic energy illumination, this, frequency $f_0$ will be shifted up and down by frequency $f_G$. If one of the shifted frequencies, for example $f_0 - f_G$, is in the bandwidth of $f_{OTF}$, it will pass through optical imaging system 10 at this frequency. The processing performed by processor 28 shifts the information back to the original frequency $f_0$.

To better understand the previous example, the following proof is presented. The following three trigonometric equations are required for this proof:

$$\cos(\alpha+\beta) = \cos(\alpha)\cos(\beta) - \sin(\alpha)\sin(\beta) \quad (13)$$

$$\sin(\alpha+\beta) = \cos(\alpha)\sin(\beta) + \cos(\beta)\sin(\alpha) \quad (14)$$

$$\cos(\alpha)\cos(\beta) = \tfrac{1}{2}[\cos(\alpha+\beta) + \cos(\alpha-\beta)] \quad (15)$$

Let $R(f_x)$ and $\phi(f_x)$ be the amplitude and phase of the Fourier transform of $r(x)$ (the object scattering function) in the x-axis so $r(x)$ in Eq. (10) takes the form of:

$$r(x) = \int_{fx} R(f_x)\cos(2\pi f_x x + \phi(f_x)) df_x \quad (16)$$

Giving:

$$I_1(t,x) = C \int_{fx} R(f_x)\cos(2\pi f_x x + \phi(f_x))\cos(-2\pi x/\delta + \omega t) df_x + Res. \quad (17)$$

Using Eq. (15) yields:

$$I_1(t,x) = C_1 \int_{fx} R(f_x)\cos(2\pi(f_x - 1/\delta)x + \phi(f_x) + \omega t) df_x + \\ C_1 \int_{fx} R(f_x)\cos(2\pi(f_x + 1/\delta)x + \phi(f_x) - \omega t) df_x + Res. \quad (18)$$

The intensity of the image, assuming incoherent imaging is given by:

$$I_2(t,x) = C_1 \int_{fx} T_0(f_x - 1/\delta) R(f_x)\cos(2\pi(f_x - 1/\delta)x + \phi(f_x) + \omega t) df_x + \\ C_1 \int_{fx} T_0(f_x + 1/\delta) R(f_x)\cos(2\pi(f_x + 1/\delta)x + \phi(f_x) - \omega t) df_x + Res. \quad (19)$$

Using Eq. (13) yields:

$$I_2(t,x) = \\ C_1 \int_{fx} T_0(f_x - 1/\delta) R(f_x)[\cos(2\pi f_x x + \phi(f_x))\cos(-2\pi x/\delta + \omega t) - \\ \sin(2\pi f_x x + \phi(f_x))\sin(-2\pi x/\delta + \omega t)] df_x + \\ C_1 \int_{fx} T_0(f_x - 1/\delta) R(f_x)[\cos(2\pi f_x x + \phi(f_x))\cos(2\pi x/\delta + \omega t) - \\ \sin(2\pi f_x x + \phi(f_x))\sin(2\pi x/\delta + \omega t)] df_x + Res. \quad (20)$$

Collecting all terms that multiply $\cos(-2\pi x/\delta + \omega t) = \cos(2\pi x/\delta - \omega t)$ and all terms that multiply $\sin(-2\pi x/\delta + \omega t) = -\sin(2\pi x/\delta - \omega t)$ yields:

$$I_2(t,x) = C_1 \cos(2\pi x/\delta + \omega t) * \int_{fx} \{T_0(f_x - 1/\delta) + \\ T_0(f_x + 1/\delta)\} R(f_x)\cos(2\pi f_x x + \phi(f_x)) df_x + C_1 \sin(2\pi x/\delta + \omega t) * \quad (21)$$

$$\int_{fx} \{T_0(f_x - 1/\delta) - T_0(f_x + 1/\delta)\} R(f_x)\sin(2\pi f_x x + \phi(f_x)) df_x + Res.$$

The synthetic images $S_1(x)$ and $S_2(x)$ derived from $I_2(t,x)$, as defined by Eq. (5), are given by:

$$S_1(x) = C_1 \int_{fx} \{T_0(f_x - 1/\delta) + T_0(f_x + 1/\delta)\} R(f_x)\cos(2\pi f_x x + \phi(f_x)) df_x \quad (22)$$

$$S_2(x) = C_1 \int_{fx} \{T_0(f_x - 1/\delta) - T_0(f_x + 1/\delta)\} R(f_x)\sin(2\pi f_x x + \phi(f_x)) df_x \quad (23)$$

The function $r(x)$ is given by Eq. (16):

$$r(x) = \int_{fx} R(f_x)\cos(2\pi f_x x + \phi(f_x)) df_x \quad (16)$$

The function $r_2(x)$ is the Hilbert transform of $r(x)$ and is given by:

$$r_2(x) = \int_{fx} R(f_x)\sin(22\pi f_x x + \phi(f_x)) df_x \quad (24)$$

Eqs. (22) and (23) thus prove theorems (a) and (b) presented above.

Optical Microscope

Described above is a novel imaging system which uses a periodic pattern of illumination in order to improve the resolution of the imaging system. As will now be described, the present invention deals with the methods of applying the technology to optical microscopes in order to extend their resolution capabilities, and to integrate three dimensional imaging capabilities in microscopy, which becomes possible by the use of periodic illumination.

In three dimensional capabilities we should consider:
(a) the capability to image a thin slice within a thick volume,
(b) the capability to identify the three dimensional information within the thin slice,
(c) the capability to create a three dimensional image of a thick volume by the integration of information related to several thin slices, and
(d) the capability to focus on those slices where there is information and to ignore other slices.

The standard light microscope can not identify the three dimensional information in a thin or thick volume. In the case of a thick volume, the information at different slices in the volume may overlap so the microscope will not be able to create a sharp image of any slice.

The prior art Confocal Microscope was developed to answer these limitations. The Confocal microscope illuminates the target with a beam focused to a small area. To create an image of the whole field of view, the object is scanned with the beam. The Confocal Microscope can create a sharp image of a thin slice which is in the focal plane of the beam, with other slices not affecting the image. Three dimensional imaging of the thick volume is possible by imaging a sequence of thin slices.

The present invention discloses a new method for three dimensional imaging, based on periodic illumination. Compared with the Confocal Microscope, the present invention has the advantage of three dimensional imaging capability within a thin slice, and the advantage of improved lateral resolution as shown above in the previous discussion in this application. As with the confocal microscope, three dimensional imaging of the thick volume is possible by imaging a sequence of thin slices.

Description of the Optical Microscope of the Present Invention

A method of imaging by optical microscope using a periodic illumination, will include three major steps:

(1) Illumination the observed object by a periodic pattern of light, (2) Imaging of the object to a camera or detector to create a signal related to the object, and (3) Mathematically processing of the signal to create synthetic images of the object.

Definitions

Illumination: The light illuminating the object may be ultraviolet, visible, infrared or any other electromagnetic wave. The illuminating pattern at the object plane may be periodic in one or two axes. We consider two important ways to create a periodic pattern of illumination:

(1) The pattern may be created by two or more coherent beams which interfere with one another. In this case, the illumination pattern is also the interference pattern. The phase of the pattern is changeable by controlling the phase of the beams.

(2) The periodic illumination pattern may be an image of another pattern (source pattern), which has a periodic structure. In this case, the illumination is enabled by projecting the image of the source periodic pattern on the observed object.

The phase of the illumination pattern may be controlled by physically moving the source pattern.

Alternatively, the the pattern itself is controlled electrically. Such devices may be divided into two groups:

(1) The electrically controlled spatial filter is an optical filter whose transmission, reflection or other optical property are controllable at each point of the filter in space. Such devices exist today, using the polarization properties of liquid crystals, such as are widely used as flat panel displays.

(2) The electrically controlled light source is a source of light for which the intensity emitted by each point in a certain space is controllable. An example of such device is the Cathode Ray Tube (CRT) which is widely used in computer monitors.

Imaging: The imaging system is an optical microscope, which collects light resulting from the interaction of the illuminating pattern with the object, to create a magnified optical image of the object. This magnified optical image of the object may be observed by the eyes or by a detector which transforms the optical image into an electrical signal. The imaging system and the optical illumination system which produces the periodic illumination pattern may share the same objective and other optical components. Alternatively, these may be two different systems of objectives and optical components "coupled" by the fact that the image plane of one system coincides with the object plane of the other system. Useful information of the object may be obtained from the image only if there is some physical interaction between the light of the illumination and the object. According to the optical configuration of the imaging system and according to the optical properties of the object, we may consider several such interactions. The interaction may be reflection, transmission, absorption, scattering, phase shifting, fluorescence, depolarization or any other physical interaction of light and matter.

Processing: The mathematical processing for the creation of one or several synthetic images is a mathematical analysis over a single optical image or over a sequence of optical images which are created while changing the phase of the illuminating pattern. The synthetic image is a mathematical function related to the object as an image, unlike the optical image which represents a physical quality like the intensity of light at the image plane. In the preceeding discussion, a useful set of synthetic images were analyzed by extracting information at the image plane. Information is extracted which is in phase with the phase of the illumination pattern, and information is extracted which 90 degrees out of phase relative to the phase of illumination pattern. These information components are used in the creation of the mathematical synthetic image. As will be explained in the following sections, there are other useful images that may be created by extracting the amplitude and phase of the optical image.

Three dimensional imaging: The periodic illumination scanning in one axis, is a process in which the object is illuminated with energy, or amplitude, or other physical quality that is significant to the measurement, having a space distribution function at the focal plane $L(x,t)$ which is a good approximation at the range of interest to:

$$L(x,t)=A_0+A_1 \cos(2\pi x/\delta+\psi(t))+A_2 \cos(4\pi x/\delta+2\psi(t))+ \qquad (25)$$

$L(x,t)$ is a periodic function, with period equal to $\delta$. The axis x coincides with the periodic axis of L. The function in L in equation (25) is written as a series of harmonics with spatial frequencies $0, 1/\delta, 2/\delta, 3/\delta, \ldots$. The scanning is enabled by changing the phase $\psi(t)$.

We will consider the illumination pattern to be tilted, if within the depth of focus, the space distribution function $L(x,z,t)$ is a good approximation in the range of interest to:

$$L(x,z,t)=A_0+A_1 \cos(2\pi x/\delta+\psi(t)+\alpha z)+ \qquad (26)$$

where $\alpha$ is constant, and $z=0$ at the focal plane. If $\alpha=0$, we will consider the illumination pattern to be non-tilted. $A_1$ may also be a function of y or z, because the z-axis measures the distance from the focal plane, where the modulation is greatest. A drop in the modulation will cause $A_0$ to increase, while all the other coefficients will decrease.

A point of the object at location (x,y,z) within the focal depth of the imaging system, will be illuminated by a periodic pattern with a phase dependent on its x and z. Knowing the (x,y) location of the point, for example, by observing the two dimensional image of the object, it is possible to analyze the height of the point on z-axis by extracting the phase $\alpha z$.

Measurment of the phase $\alpha z$ in (26) can be done qualitatively by observation of the lines of illumination in a static mode, where $L(x,z)$ is time-independent. The lines will create a meshing over the object, the shape of the meshing effect being a function of the topology of the object. A more accurate measure is enabled by shifting the phase $\psi(t)$. For example, we may consider a constant rate of phase shift, $\omega$, so equation (26) will have the form of:

$$L(x,z,t)=A_0+A_1 \cos(2\pi x/\delta+\omega t+\alpha z)+ \qquad (27)$$

The image of the object illuminated by such a pattern will have the form of:

$$I(x,y,t)=B_0(x,y)+B_1(x,y)\cos(2\pi x/\delta+\omega t+\alpha z+\phi(x,y))+ \qquad (28)$$

In equation (28), the axes x,y are the equivalent axes to the axes x,y in the object plane, imaged to the image plane. It is possible to evaluate both amplitude $B_1(x,y)$, and the phase $[2\pi x/\delta+\alpha z+\phi(x,y)]$ at any desired point in (x,y) by means of Fourier transformation in time domain. The phase measured at the image plane contains the useful component, $\alpha z$, from which the height z may be measured, plus an additional phase $\phi(x,y)$, which limits the accuracy of the measurement of z. The additional phase $\phi(x,y)$ has a high value at high spatial frequencies, and a low value at low spatial frequencies. The third component in the evaluated phase is $2\pi x/\delta$. This component is known for a known point location x, and known period $\delta$.

The Fourier time domain transformation does not necessarily require a constant rate of phase shifting, $\psi$. It is possible to extract the same information through a sequence of images resulting from phase shifting in discrete steps. Thus, it is possible to evaluate three dimensional information of an object, by illuminating the object with a tilted periodic pattern, and creating synthetic images by measuring the phase and amplitude at the optical image plane. The images created by measuring phase and amplitude at the image plane, may also be useful for the non-tilted illumination pattern. For example, if the object contains a unique, adjacent point, which interacts with the illumination, the phase information which includes the component $2\pi x/\delta$ will yield the exact location of the point of interest on the x axis. The example given here is with illumination pattern periodic in one axis, x. The method can be used for an illumination pattern which is periodic in a different axis or which is periodic in two axes.

The case of the periodic illumination in two axes, x and y, is a simple continuation of the case of a periodic pattern in one axis, x. The same method for three dimensional imaging using a periodic illumination pattern in a single axis, x, can be applied in both axes, x and y.

The method of imaging an object using a periodic illumination pattern may yield information of a thin slice within a thick volume. Only the thin slice, which is in the depth of focus of the microscope and the optical system which produces the illumination pattern, can contribute to the image. The three dimensional imaging of a thick volume is enabled by creating a sequence of thin slice images. In the case of a non-tilted periodic illumination pattern, the vertical resolution is equal to the thickness of the slices. A tilted illumination pattern may be used to provide a better vertical resolution.

Automatic Focusing

The periodic pattern illumination is also very useful for focusing the optical system. The periodic illumination pattern is a uniform illumination modulated by a periodic pattern. The periodic pattern creates a modulation over the illuminated object with the spatial frequency of the basic period of the pattern and its higher harmonics. If the observed object is in the focal plane of the microscope and the illumination, the optical image of the object will also appear to be modulated with the same spatial frequency. If the object is out of focus, modulation of the illumination will decrease. Therefore, measuring the amplitude of the modulation frequency over the optical image can verify that there is an object within the the focal range of the microscope and the illumination system, and can help to optimize adjustment of the position of the focal plane for better imaging of the object. The focal range contains the object plane of the microscope and a certain range below and above the object plane, so that any object within that range may create a sharp optical image modulated by the periodic illumination pattern. The range of sharp optical image is the depth-of-field of the microscope.

Fourier transformation of the optical image at a certain range of interest will yield the amplitude of the modulating spatial frequency. Depending on the optical configuration and the interaction of the illumination with the object, high or low amplitude will indicate that the imaging system is in focus. If the optical image is created by light transmitted through the object, low amplitude of the modulating frequency will indicate that there is an interaction of the periodic illumination pattern with the object. If there is no interaction at the object plane, then the illumination pattern will be transmitted without any interference, therefore the amplitude of the modulation frequency will be high. In contrast, if the interaction of the periodic illumination pattern with the object is by reflection, then a high amplitude of the modulating frequency at the image plane will indicate that there is an object within the focal range which reflects some of the illumination. Other types of interactions, such as fluorscence, will also yield a high amplitude of the modulating frequency. Therefore, it is possible to identify an interaction of the illumination with the object at the focal range of a microscope by illuminating an object with a periodic illumination pattern, and by measuring the amplitude of the modulating frequency at the area of interest on the optical image.

It is also possible to optimize the focus of the imaging microscope by measuring the amplitude of the modulation frequency while varying the focal range of the microscope, then finding the range at which the interaction of illumination with the object is the greatest. Depending on the type of interaction, the highest or lowest amplitude of the modulation frequency will correspond to the greatest interaction.

Illumination of the object with a periodic illumination pattern creates spatial modulation with the basic frequency of the period. One may also create temporal modulation by varying the phase of the pattern. For example, if we illuminate an object with the periodic pattern of equation (27), we may identify a spatial modulation with the spatial modulation frequency $1/\delta$, and may also identify a temporal modulation with temporal modulation frequency $\omega/2\pi$. Higher harmonics of these frequencies may also modulate the optical image. Measurement of the modulation of the optical image can be done either in space domain or in time domain. In space domain, the modulation will be measured by analysing the amplitude of the spatial modulating frequency in space domain at the area of interest of the optical image. The amplitude of the modulation at a certain frequency is obtained from the Fourier transformation of the optical image at that frequency. In time domain, the modulation will be measured by analysing the amplitude of the temporal modulation frequency in time domain at any point or an area of the optical image.

In equation (27), the phase of the periodic illumination pattern is varied continuously at a constant rate $\omega$. The phase could also be varied in discrete steps rather than continuously. In certain cases, varying the phase from zero to $2\pi$ is rather complicated and a smaller range of phase variations is desired (for example, in the case that the phase is shifted by mechanically moving a source pattern). In that case, it is possible to vary the phase of the periodic illumination pattern harmonically at a certain frequency, f, in time. For a periodic illumination in one axis of equation (26), illumination with harmonic phase variation will have a space and time distribution function which is a good approximation at the range of interest to L(x,t):

$$L(x,t) = A_0 + A_1 \cos(2\pi x/\delta + a_m \cos(2\pi ft)) + \quad (29)$$

where f is the phase modulation frequency in time domain.

Assuming the phase variations are small, so that $a_m \ll 2\pi$, the modulation in time domain may be measured by analysing the amplitude of the phase modulation frequency, f, in time domain, at any point or area of the optical image. The amplitude of the phase modulation frequency, f, in time domain is defined by the Fourier transformation in time domain at the same frequency. The example given here is with illumination pattern periodic in one axis x. The method can be used for illumination pattern periodic in a different axis or periodic in two axes.

The method of focusing the optical microscope using the periodic pattern illumination may also be used to couple the microscope to another optical imaging system. One way to produce the illumination pattern is by providing a source pattern and projecting its image on the object. The optical system that projects the illumination pattern on the object should be coupled to the optical microscope that produces the optical image, so the image plane of the first system (projection system) will coincide with the object plane of the other system (microscope). If the the two systems do not share the same objective lens, then an adjustment will be required to couple them together. For example, if the optical system which projects the illumination pattern is an optical microscope having its own microscope objective, then the coupling to the imaging microscope will be enabled by adjusting the distance between the two objectives. A method for coupling the two optical systems is provided by projecting a periodic illumination pattern with one system while imaging the pattern with the other, and adjusting the image plane of one system to the object plane of the other to produce the sharpest optical image. The sharpness of the optical image of the periodic pattern can be measured either by measuring the amplitude of the modulation frequency in spatial domain or by measuring the amplitude of the modulation frequency in time domain. These measurements were part of the focusing method explained before.

Implementation

Figure 4:
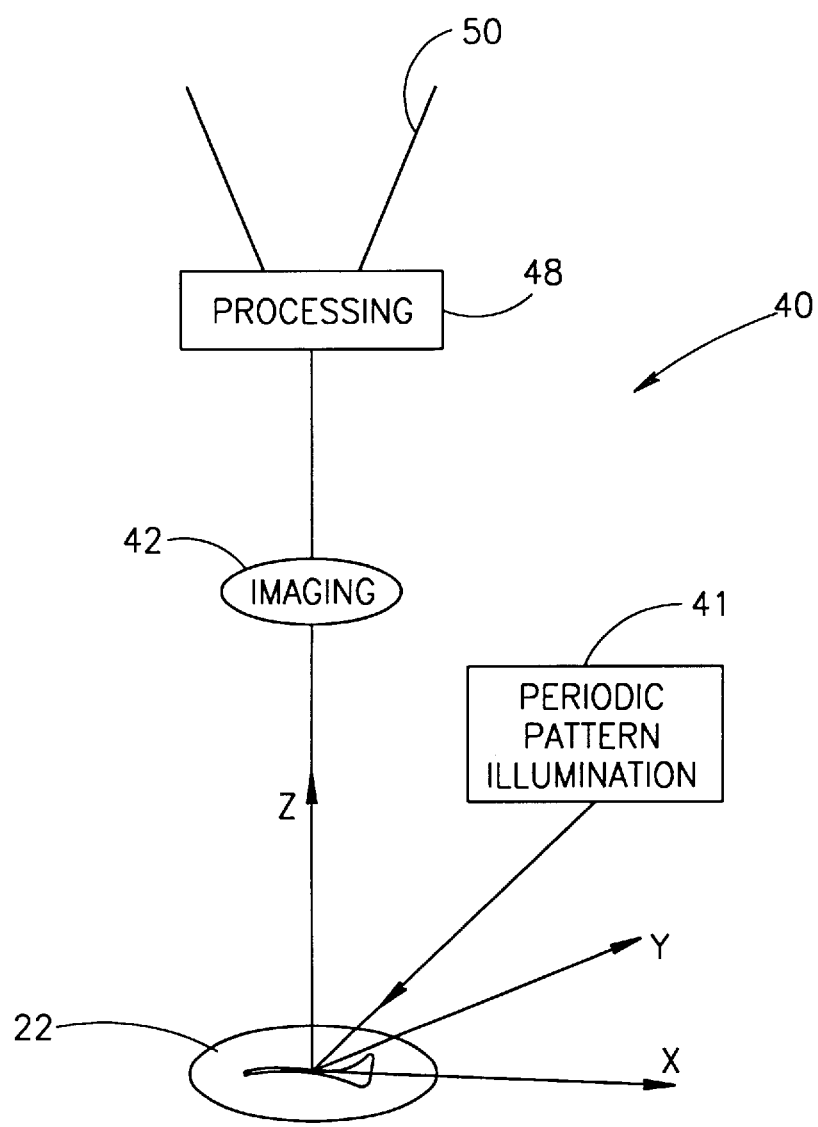

Construction of the physical hardware and provision of the software necessary to implement the method of the present invention, will be within the understanding and ability of skilled artisans in the field. A symbolic representation of a physical optical microscope system, 40, according to the present invention is shown in FIG. 4. Periodic illumination, 41, is provided by any appropriate illumination source, as described above. For example, the combination of light source, 12, and grating, 14, of FIG. 2, with motor, 26, moving grating, 14, may be used. In the illustration of FIG. 4, the periodic illumination pattern is periodic in the x direction. The x, y, and z axes shown are orthogonal axes in three-space. The physical interaction of the periodic illumination with the object, 22, may be any of a wide variety of interactions. These include reflection, as shown for the purpose of illustration, in FIG. 4. Imaging, 42, is provided by any appropriate imaging system, such as an optical microscope with a photodetector device, to develop an electronic representation "optical image". The optical image provided by the imaging system is processed by any appropriate processor, such as an electronic digital computer. Processing, 48, of the optical image, produces at least one synthetic image, 50. The synthetic images are the result of processing according to the methods of the present invention, using the unique combination of hardware, including periodic illumination, and software, called for by the method of the present invention. The processing, 48, consists of mathematically operating on the optical image to produce at least one synthetic image, 50.

While the invention has been described with respect to a limited number of embodiments, it will be appreciated that many variations, modifications and other applications of the invention may be made. For example, in the implementation of FIG. 2, lens, 20, may be a microscope objective, and lens, 16, may be a tube lens. It is possible that lenses 16 and 26 may be omitted, and a single lens or set of lenses, 20, will both project the illumination pattern and image the object. While lenses 16, 20, and 26, are illustrated as simple lenses, in general, they may represent complex lenses or lens systems.

A tilted illumination pattern may be implemented by collimating the beam illuminating the grating, 14, and tilting the collimated beam with respect to the optical axis of the lenses, 16 and 20. If the collimated beam is parallel to the optical axis, then the illumination pattern will be non-tilted.

While the invention has been described with respect to a limited number of embodiments, it will be appreciated that many variations, modifications and other applications of the invention may be made.

While the above discussion of the present invention is expressed in terms of a microscope, which is an optical imaging system which produces a magnified optical image of an object, the invention is not limited only to use with microscopes. Rather, the present invention applies to any optical imaging system for which the periodic pattern illumination can be used.

What is claimed is:

1. A method of improving the resolution of imaging systems, for imaging an object, comprising the steps of:
   illuminating the object with a periodic pattern;
   scanning the object with said periodic pattern whereby the phase of said periodic pattern is varied;
   receiving a plurality of images, representing said periodic pattern illuminating the object, said images corresponding to variations in the phase of said periodic pattern;
   forming a first linear transformation of said plurality of images to produce a first synthetic image representing information in phase with said periodic pattern; and
   forming a second linear transformation of said plurality of images to produce a second synthetic image representing information 90 degrees out of phase with said periodic pattern.

2. A method of improving the resolution of imaging systems, for imaging an object, comprising the steps of:
   illuminating the object with a periodic pattern;
   scanning the object with said periodic pattern in one dimension whereby the phase of said periodic pattern is varied;
   receiving a plurality of images, representing said periodic pattern illuminating the object, said images corresponding to variations in the phase of said periodic pattern; and
   producing at least one synthetic image by forming at least one linear transformation of said plurality of images, said at least one linear transformation representing at least one information selected from the group consisting of
   (a) information in phase with said periodic pattern and information 90 degrees out of phase with said periodic pattern, (b) information exclusively in phase with said periodic pattern, and (c) information exclusively 90 degrees out of phase with said periodic pattern.

3. A method of improving the resolution of imaging systems, for imaging an object, comprising the steps of:

illuminating the object with a periodic pattern in two dimensions, along an x-axis and a y-axis;

scanning the object with said periodic pattern in two dimensions, whereby the x-axis and y-axis phases of said periodic pattern are varied;

receiving a plurality of images, representing said periodic pattern illuminating the object, said images corresponding to variations in the phases of said periodic pattern along said x- and y- axes; and producing at least one synthetic image by forming at least one linear transformation of said plurality of images, said at least one linear transformation representing at least one information selected from the group consisting of (a) information in phase with said periodic pattern along said x-axis and in phase with said periodic pattern along said y-axis, (b) information 90 degrees out of phase with said periodic pattern along said x-axis and 90 degrees out of phase with said periodic pattern along said y-axis, (c) information in phase with said periodic pattern along said x-axis and 90 degrees out of phase with said periodic pattern along said y-axis, and (d) information 90 degrees out of phase with said periodic pattern along said x-axis and in phase with said periodic pattern along said y-axis.

4. An apparatus for enhancing the resolution of an imaging system, for imaging an object, comprising:

an energy source;

periodic means for producing an illuminating periodic pattern in one dimension from said energy, said periodic means movable in one dimension whereby the phase of said periodic pattern may be varied in one dimension;

a first imaging system for passing said periodic pattern from said periodic means through to the object whereby the object interacts with said periodic pattern;

a second imaging system coupled to said first imaging system, said second imaging system for converting energy resulting from interaction between the object and said periodic pattern into an electrical signal, said electrical signal representing images of said energy resulting from interaction between the object and said periodic pattern; and, a processor coupled to said periodic means and said second imaging system, said processor for controlling said periodic means in one dimension, said processor for forming linear transformations of said images that represent information in phase with said periodic pattern and information 90 degrees out of phase with said periodic pattern.

5. The apparatus of claim 4, wherein said periodic means includes a grating.

6. The apparatus of claim 4, wherein said processing means causes said periodic means to move continuously whereby the phase of the illuminating periodic pattern falling on the object is varied continuously.

7. The apparatus of claim 4, wherein said processing means causes said periodic means to move in discrete steps whereby the phase of the illuminating periodic pattern falling on the object is varied in discrete steps.

8. An apparatus for enhancing the resolution of an imaging system, for imaging an object, comprising:

an energy source;

periodic means for producing an illumination pattern periodic in two dimensions from said energy, said periodic means movable in two dimensions whereby the phases of said periodic pattern may be varied in two dimensions;

a first imaging system for passing said periodic pattern from said periodic means through to the object whereby the object interacts with said periodic pattern;

a second imaging system for converting energy resulting from interaction between the object and said periodic pattern into an electrical signal, said electrical signal representing images of energy resulting from interaction between the object and said periodic pattern; and a processor coupled to said periodic means and said second imaging system, said processor for controlling said periodic means in two dimensions, said processor for forming linear transformations of said images that represent two dimensional information in phase with said periodic pattern and two dimensional information 90 degrees out of phase with said periodic pattern.

9. The apparatus of claim 8, wherein said periodic means includes two gratings oriented 90 degrees apart.

10. The apparatus of claim 8, wherein said processor causes said periodic means to move continuously whereby the phase of the illuminating periodic pattern falling on the object is varied continuously.

11. The apparatus of claim 8, wherein said processor causes said periodic means to move in discrete steps whereby the phase of the illuminating periodic pattern falling on the object is varied in discrete steps.

12. A method for imaging an object comprising the steps of:

(a) illuminating the object with a periodic illumination pattern whereby the object interacts with said periodic illumination pattern;

(b) scanning the object with said periodic illumination pattern whereby the phase of said periodic illumination pattern is varied;

(c) providing an optical microscope for imaging said interaction of the object with said periodic illumination pattern, said imaging thereby producing optical images, said optical images representing said interaction of the object with said periodic illumination pattern;

(d) producing a plurality of said optical images with said optical microscope;

(e) providing a processor for mathematically processing said optical images to produce a synthetic image; and (f) processing said optical images with said processor to produce a synthetic image, said processing including forming at least one linear transformation of said optical images, said at least one linear transformation representing information selected from the group consisting of information in phase with said periodic illumination pattern and information 90 degrees out of phase with said periodic illumination pattern.

13. The method of claim 12, wherein said periodic illumination pattern is tilted.

14. The method of claim 12, wherein said interaction of said periodic illumination pattern with the object is scattering.

15. The method of claim 12, wherein said interaction of said periodic illumination pattern with the object is reflection.

16. The method of claim 12, wherein said interaction of said periodic illumination pattern with the object is transmission.

17. The method of claim 12, wherein said interaction of said periodic illumination pattern with the object is phase shifting.

18. The method of claim 12, wherein said interaction of said periodic illumination pattern with the object is absorption.

19. The method of claim 12, wherein said interaction of said periodic illumination pattern with the object is fluorescence.

20. The method of claim 12, wherein said interaction of said periodic illumination pattern with the object is depolarization.

21. The method of claim 12, wherein said processing to produce said synthetic image includes measuring the phase of said optical image at the image plane.

22. The method of claim 12, wherein said processing to produce said synthetic image includes measuring the amplitude of said optical image at the image plane.

23. The method of claim 12, wherein said periodic illumination pattern is an image of a source pattern which has a periodic structure.

24. The method of claim 23, wherein said source pattern is an electronically controlled spatial filter.

25. The method of claim 23, wherein said source pattern is an electronically controlled light source.

26. The method of claim 12, wherein said periodic illumination pattern is an interference pattern of a plurality of coherent beams, thereby providing a coherent interference pattern.

27. A method for imaging an object comprising the steps of:
  (a) illuminating the object with a periodic illumination pattern which is periodic in two dimensions, whereby the object interacts with said periodic illumination pattern;
  (b) scanning the object in two axes with said periodic illumination pattern whereby the phase of said periodic illumination pattern is varied in said two axes;
  (c) providing an optical microscope for imaging said interaction of the object with said periodic illumination pattern, said imaging thereby producing optical images, said optical images representing said interaction of the object with said periodic illumination pattern;
  (d) producing a plurality of said optical images with said optical microscope;
  (e) providing a processor for mathematically processing said optical images to produce a synthetic image; and
  (f) processing said optical images with said processor to produce a synthetic image, said processing including forming at least one linear transformation of said optical images, said at least one linear transformation representing information selected from the group consisting of:
    (i) information in phase with said periodic illumination pattern in both said axes,
    (ii) information 90 degrees out of phase with said periodic illumination pattern in both said axes, and
    (iii) information in phase with said periodic illumination pattern in one said axis and 90 degrees out of phase with said periodic illumination pattern in another said axis.

28. The method of claim 27, wherein said periodic illumination pattern is tilted.

29. The method of claim 27, wherein said interaction of said periodic illumination pattern with the object is scattering.

30. The method of claim 27, wherein said interaction of said periodic illumination pattern with the object is reflection.

31. The method of claim 27, wherein said interaction of said periodic illumination pattern with the object is transmission.

32. The method of claim 27, wherein said interaction of said periodic illumination pattern with the object is phase shifting.

33. The method of claim 27, wherein said interaction of said periodic illumination pattern with the object is absorption.

34. The method of claim 27, wherein said interaction of said periodic illumination pattern with the object is fluorescence.

35. The method of claim 27, wherein said interaction of said periodic illumination pattern with the object is depolarization.

36. The method of claim 27, wherein said processing to produce said synthetic image includes measuring the phase of said optical image at the image plane.

37. The method of claim 27, wherein said processing to produce said synthetic image includes measuring the amplitude of said optical image at the image plane.

38. The method of claim 27, wherein said periodic illumination pattern is an image of a source pattern which has a periodic structure.

39. The method of claim 38, wherein said source pattern is an electronically controlled spatial filter.

40. The method of claim 38, wherein said source pattern is an electronically controlled light source.

41. The method of claim 27, wherein said periodic illumination pattern is an interference pattern of a plurality of coherent beams, thereby providing a coherent interference pattern.

* * * * *